April 28, 1942.  G. D. EVANS  2,280,809
WING LOCKING PIN WARNING DEVICE
Filed May 8, 1940   2 Sheets-Sheet 1
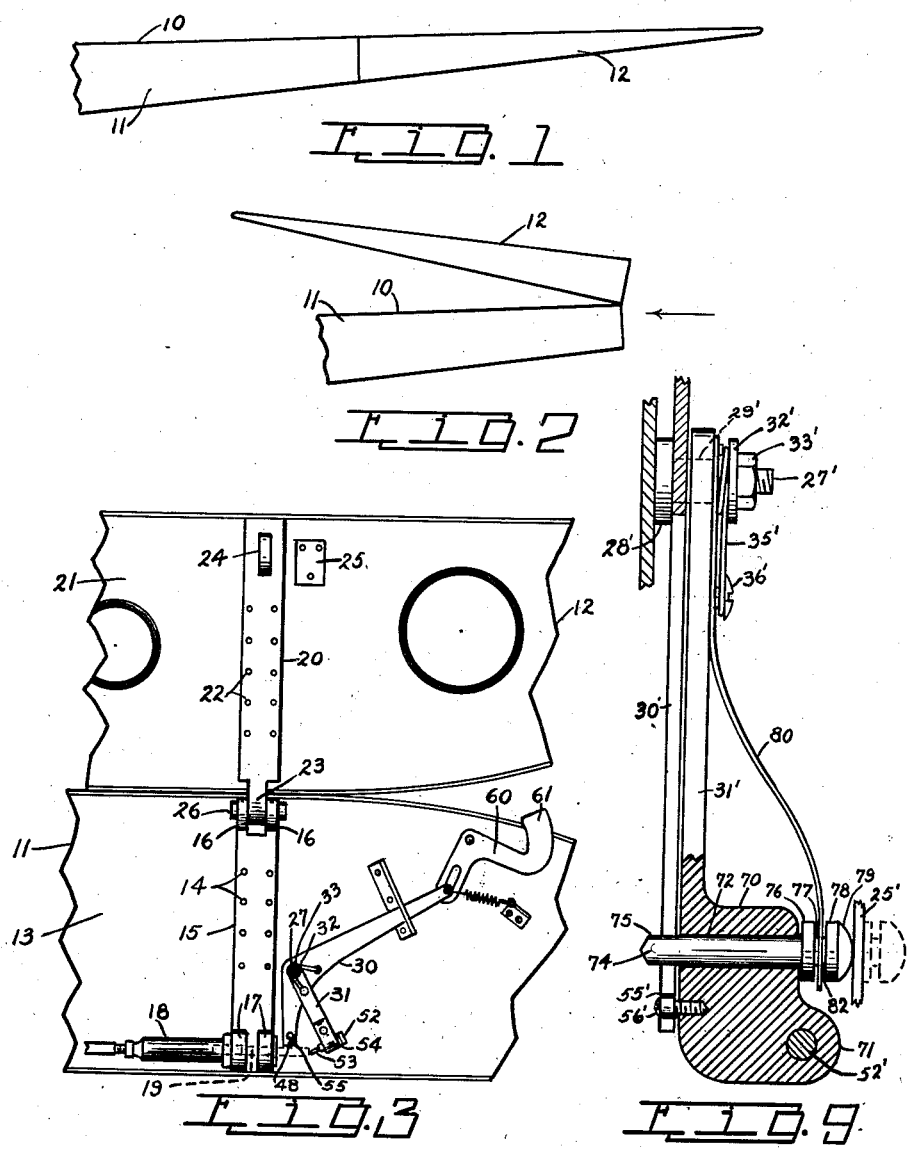
INVENTOR
GEORGE DORSEY EVANS
BY
ATTORNEY April 28, 1942.   G. D. EVANS   2,280,809
WING LOCKING PIN WARNING DEVICE
Filed May 8, 1940   2 Sheets-Sheet 2
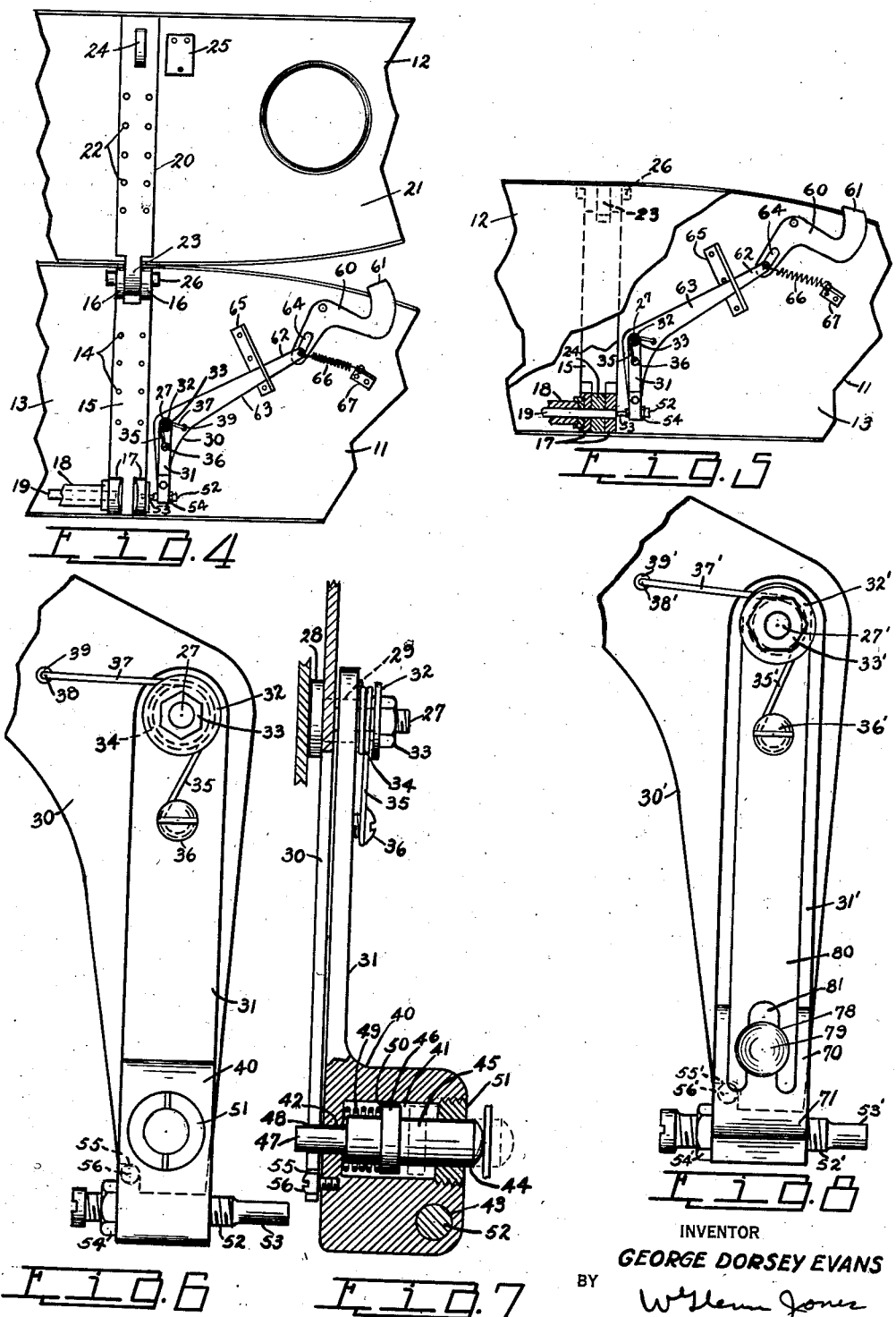
INVENTOR
GEORGE DORSEY EVANS
BY
ATTORNEY Patented Apr. 28, 1942

2,280,809

UNITED STATES PATENT OFFICE 2,280,809

WING LOCKING PIN WARNING DEVICE

George D. Evans, Upper Darby, Pa.

Application May 8, 1940, Serial No. 334,140

REISSUED

5 Claims. (Cl. 116—124)

(Granted under the act of March 3, 1883, as amended April 30, 1928; 370 O. G. 757)

The prevent invention relates to a wing locking pin warning device adapted for use with airplanes having folding wings.

It is an object of the present invention to provide a locking pin having means for giving a positive indication that the wings are securely locked when an outer wing panel is lowered and in line with a fixed wing portion of an airplane.

Another object of the present invention is the provision of means on an airplane wing for operating a wing locking pin and, at the same time, make provision for warning when the wings of an airplane are not mated or are unlocked.

A still further object of the present invention is the provision of means for adjusting a warning device.

Other objects and advantages will become apparent as the description proceeds and is taken in connection with the accompanying drawings wherein like characters of reference designate corresponding parts throughout the several views and wherein—

Figure 1 is a fragmentary, diagrammatic view of an airplane wing with its outer section in locked position.

Figure 2 is a fragmentary, diagrammatic view of an airplane wing with its outer section folded and in unlocked position.

Figure 3 is a fragmentary, enlarged detailed end view, looking in the direction of the arrow in Figure 2 and illustrating the wing pin aperture and safety arm stop in the bell crank.

Figure 4 is a view similar to Figure 3, showing the normal position of the safety arm, bell crank and flag, illustrating unlocked position.

Figure 5 is a fragmentary enlarged view similar to Figure 4, partly in section and showing the wing sections in closed position.

Figure 6 is an enlarged detailed elevational view of the bell crank and safety arm, the bell crank being shown fragmentarily.

Figure 7 is a side elevational view of Figure 6, a portion of the safety arm shown in section and illustrating in detail the wing pin.

Figure 8 is a modification of Figure 6 and illustrates a spring mounted on the safety arm and connected to a wing pin.

Figure 9 is a side elevational view of Figure 8, illustrating a spring connected to a modified wing pin, a portion of the safety arm shown in section.

Referring now to the drawings in detail, the numeral 10 represents the wing of an airplane having a stationary inner panel 11 and a folding outboard panel 12. Secured to the end wall 13 of panel 11 by rivets 14 is a strap 15 having at the top and bottom spaced apertured lugs 16 and 17, respectively. To lugs 17 is secured in any suitable manner a housing 18 in which is mounted for slidable movement a hinge pin 19. The outer panel 12 carries a strap 20 that is riveted to the end wall 21 by rivets 22, the strap being provided with an apertured tongue 23, an apertured lug 24 and a contact plate 25. The tongue 23 is hinged to lug 16 by a pin 26 providing a hinge for the movement of the outer wing 12.

Secured to the wing end wall 13 and extending therefrom is a bolt 27 that carries a bushing 28 on the shank 29 on which is mounted a bell crank 30 and a safety arm 31, the bushing 28 being held in locked engagement on the bolt 27 by a washer 32 and a nut 33. The safety arm 31 is illustrated in Figure 3 in an exaggerated unlocked position and shows the directing movement of the hinge pin and the safety arm when the wings are closed, but not mated. Interposed between the outer face of the safety arm 31 and the inner face of the washer 32 is a spring 34 that encircles the bushing shank 29, leg 35 of the spring being secured to the safety arm 31 by a machine screw 36, leg 37 of the spring being provided with a hooked end 38 that engages aperture 39 in the bell crank 30. The lower end of the safety arm 31 is provided with an oblong shoulder 40 having a bore 41, a reduced bore 42 and a longitudinally threaded bore 43.

A wing pin 44, having a shank 45, a flange 46 and a reduced shank 47 is mounted in the safety arm 31. The shank 45 and flange 46 being housed in the bore 41 and the shank 47 is housed in the bore 42 so as to engage aperture 48 in the bell crank. Housed in the bore 41 and encircling the shank 45 of the wing pin 44 is an expansion spring 49, one end of which impinges against the end wall of the bore 41, and the opposite end impinges the inner face 50 of the flange 46. The mouth of the bore 41 is threaded to receive retaining nut 51 that is provided with an aperture for movement of the wing pin shank 45 therethrough. Within the longitudinally threaded bore 43 is a threaded adjustment bolt 52 having a reduced end 53, the bolt being securely held in adjusted and locked position by nut 54. The bell crank 30 is provided with an L-shaped cut out portion 55 adapted to engage a stop 56 that limits the movement of the safety arm toward the lugs 17. Pivotally mounted to the wing wall 13 is a member 60 of substantially Z-shaped configuration having a portion 61 serving as a warning flag to be explained later.

Linked to one end of the member 60 is the end 62 of the arm 63 of the bell crank 30, the connecting link being slidable in a slot 64. The arm 63 passes through a slot in a guide plate 65 that is secured to the wing end wall 13. One end of a tension spring 66 is connected to the arm 63 of the bell crank 30 and the opposite end to an anchor plate 67 that is secured to the wing end wall 13.

In Figures 8 and 9 of the drawings, I have illustrated a modification of my invention in which the shoulder 70 of the safety arm 31' is provided with a semi-circular bulge 71. Within the shoulder 70 is a bore 72 of uniform diameter in which is mounted for slidable movement the shank 74 of a wing pin 75. The wing pin has a flange 76, a groove 77 and a head 78 with an arcuate portion 79. One end of a spring 80 is apertured and engages the shank 29' of the bushing 23', the spring being further secured to the safety arm 31' by a bolt 36'. The lower end of the spring 80 is provided with a slot 81 that engages the shank portion 82 of the wing pin.

In the operation of my wing pin warning device, as illustrated in Figures 2 and 4, the outer wing panel being folded back, the portion 61 of the member 60 extends above the surface of the wing, indicating that the wings are unlocked. The position of the bell crank and safety arm are in normal position and the wing pin is out of engagement with the bell crank.

When the outer wing panel 12 is in the position as indicated in Figure 1, the mechanism as illustrated in Figure 5, assumes the position as disclosed, that is, the lug 24 being in position between the lugs 17, the block 25 forces the wing pin 44 into the aperture 43 locking the safety arm 31 to the bell crank 30, the hinge pin 19 passing through the lugs 17 contacts the end of the adjustment bolt 52, and the force exerted against bolt 52 forces the bell crank to move upwardly and during the upward movement, the warning flag also moves, the end 61 being moved approximately flush with the wing edges, indicating that the wing sections are mated and in locked position.

If the wings have not properly mated, the wing pin 44 in the safety arm 31 will not have engaged the bell crank 30, and moving the hinge pin 19 into locked position will rotate only the safety arm. The bell crank will not rotate under this condition and the warning flag 60 will remain up, indicating that the wings are not locked.

The invention described herein may be manufactured and/or used by or for the Government of the United States of America for governmental purposes without the payment of any royalties thereon or therefor.

What I claim is:

1. In a folding wing locking pin warning device for airplanes comprising hinge members mounted on the stationary and the folding parts of the wing and comprising inter-engaging lugs and a locking pin to engage said lugs and connected to one of the lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, means carried by the other of said wing parts and adapted for engagement with one of the engaging means in said arm to force said one engaging means into engagement with the means in said bell crank when the lug on the folding part of the wing moves into inter-engaging position with the lugs on the stationary wing part, whereby the arm is locked to the bell crank.

2. In a folding wing locking pin warning device for airplanes comprising hinge members mounted on the stationary and the folding parts of the wing and comprising inter-engaging lugs and a locking pin to engage said lugs and connected to one of the lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, tension means connected to said bell crank and to said arm for alignment of one of said engaging means in said arm with the means in said bell crank, means carried by the other of said wing parts and adapted for engagement with one of the engaging means in said arm to force said one engaging means into engagement with the means in said bell crank when the lug on the folding part of the wing moves into inter-engaging position with the lugs on the stationary wing part, whereby the arm is locked to the bell crank.

3. In a folding wing locking pin warning device for airplanes comprising hinge members mounted on the stationary and the folding parts of the wing and comprising inter-engaging lugs and a locking pin to engage said lugs and connected to one of said lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, tension means connected to said bell crank and to said arm for alignment of one of said engaging means in said arm with the means in said bell crank, means carried by the other of said wing parts and adapted for engagement with one of the engaging means in said arm to force said one engaging means into engagement with said means in said bell crank, when the lug on the folding part of the wing moves into inter-engaging position with the lugs on the stationary wing part, whereby the arm is locked to the bell crank, the bell crank actuated by said locking pin actuates the warning means to indicate locked position of said wing parts.

4. In a folding wing locking pin warning device for airplanes comprising hinge members mounted on the stationary and the folding parts of the wing and comprising inter-engaging lugs and a locking pin to engage said lugs and connected to one of said lugs, a bell crank and arm pivotally mounted on one of said wing parts, a warning means pivotally mounted on one of said wing parts and slidably connected to said bell crank, engaging means mounted in said arm, one of said engaging means adapted for engagement with means in the bell crank, the other of said engaging means adapted for engagement with the locking pin, tension means connected to said bell crank and to said arm for alignment of one of said engaging means in said arm with the means in said bell crank, means carried by the other of said wing parts adapted for engagement with one of the engaging means in said arm, to force said one engaging means into engagement with said means in said bell crank, when the lug on the folding part of the wing moves into inter-engaging position with the lugs on the stationary wing part, tension means connected to the stationary wing part, and to said bell crank for normally urging the warning means to operative position prior to engagement of the locking pin with said lugs, whereby the warning means indicate the said wing parts are in unlocked position.

5. In a folding wing locking pin warning device comprising hinge members mounted on the stationary and folding parts of the wing and comprising inter-engaging lugs and a locking pin to engage said lugs and connected to one of the lugs, a bell crank and arm pivotally mounted on one of said wing parts, engaging means in said arm, means on one of said wing parts adapted to force one of said engaging means into engagement with means in the bell crank, the other of said engaging means adapted for engagement with the said locking pin carried by one of said lugs, a warning means pivotally mounted on one of said wing parts and operatively connected to said bell crank, tension means connected to said bell crank, said tension means normally urging the warning means to operative position prior to engagement of the locking pin with said second-named engaging means whereby the warning means indicate the said wing parts are in unlocked position.

GEORGE D. EVANS.